United States Patent [19]

Smith

[11] 4,262,865
[45] Apr. 21, 1981

[54] HARNESS RELEASE MECHANISM

[75] Inventor: David R. Smith, Sydney, Australia

[73] Assignee: Parachutes Australia Pty. Ltd., Sydney, Australia

[21] Appl. No.: 4,230

[22] Filed: Jan. 17, 1979

[51] Int. Cl.³ .............................................. B64D 17/30
[52] U.S. Cl. ................................ 244/151 A; 244/147; 244/151 B
[58] Field of Search ............ 244/151 R, 151 A, 151 B, 244/149, 147, 148; 54/85; 119/96; 24/201 R, 197, 73 PH

[56] References Cited

U.S. PATENT DOCUMENTS

| 3,464,653 | 9/1969 | Basnett | 244/148 |
|---|---|---|---|
| 3,765,627 | 10/1973 | Snyder | 244/151 A |
| 3,934,848 | 1/1976 | Snyder | 244/151 A |

FOREIGN PATENT DOCUMENTS

| 564721 | 2/1958 | Belgium | 244/151 B |
|---|---|---|---|
| 1226884 | 10/1966 | Fed. Rep. of Germany | 244/151 A |
| 1172592 | 12/1969 | United Kingdom | 244/151 B |
| 1221790 | 2/1971 | United Kingdom | 244/147 |

*Primary Examiner*—Douglas C. Butler
*Attorney, Agent, or Firm*—Ostrolenk, Faber, Gerb & Soffen

[57] ABSTRACT

The disclosure concerns a parachute release mechanism which comprises a harness connector for releasably connecting the risers of a main parachute canopy to a harness which is worn by a parachutist and which further comprises an actuating system for sequentially actuating release of the main canopy from the harness and for then effecting deployment of a reserve canopy from its compartment within a container. The actuating system includes first and second cables which are respectively employed to actuate release of the main canopy and to actuate deployment of the reserve canopy. The first cable is pulled to a predetermined extent to effect release of the main canopy. Pulling of the first cable beyond the predetermined extent deploys the second canopy. A sliding interconnection is provided between the first and second cables whereby the first cable moves relative to the second cable during the first predetermined extent of travel of the first cable but, thereafter, a release handle portion which is associated with the first cable engages with a handle which is associated with the second cable and causes reserve canopy deployment movement of the second cable. Due to the sliding interconnection of the first and second cables, the second cable can be moved independently of the first cable to effect deployment of the reserve canopy without the main canopy being first released.

10 Claims, 12 Drawing Figures

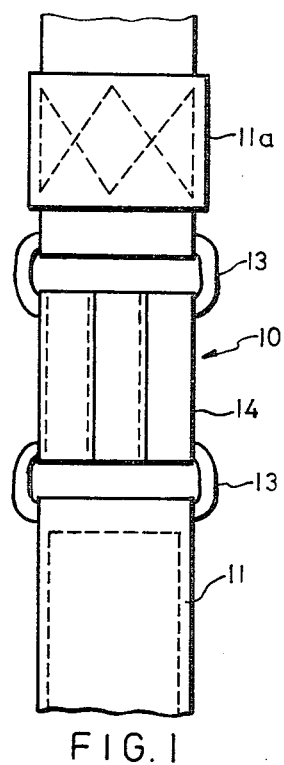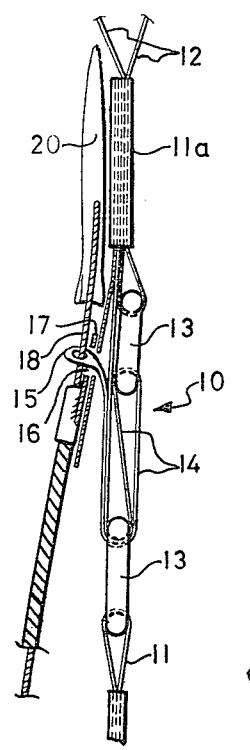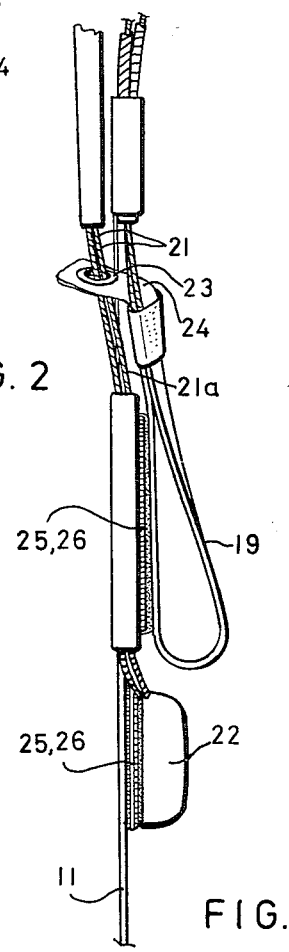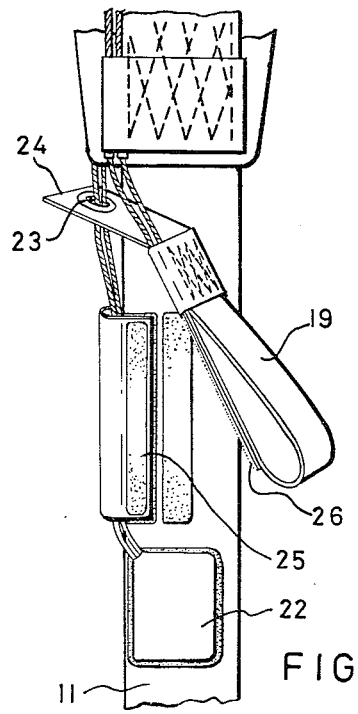
FIG. 1
FIG. 2
FIG. 3
FIG. 4

HARNESS RELEASE MECHANISM

FIELD OF THE INVENTION

This invention relates to a parachute release mechanism and to a parachute assembly incorporating such mechanism.

BACKGROUND OF THE INVENTION

It is modern practice, for safety reasons, to incorporate both a main and a reserve canopy in a parachute assembly intended for personal use. The reserve canopy provides a fail-safe measure in case the main canopy should malfunction for any reason. Thus, should the main canopy fail to open fully, for example, the parachutist would disconnect the main canopy from its harness and release the reserve canopy from the container. Normally the reserve canopy is stored in a separate compartment from that which stores the main canopy or it may be stored in a separate container.

It is generally necessary that, in case of a malfunction, the main canopy be disconnected completely from its harness before the reserve canopy is released. Otherwise there is the serious danger that the two may entangle, with fatal results. On the other hand, the reserve canopy should preferably be released as soon as possible after the main canopy has been disconnected since time in this regard can be a critical factor. Conventionally, the harness connecting the main canopy to the container includes a mechanical release mechanism which is actuated by the parachutist to eject the main canopy, while the reserve canopy is released by a separate rip cord. Such an arrangement has the disadvantage that two separate operations are required by the parachutist, who must ensure that these operations are carried out in the correct order as indicated above, with the shortest possible time delay between the operations. However, especially for inexperienced parachutists, the possibility of a mistake or undue delay in carrying out these operations is a very real one and poses a significant danger.

It is important that the mechanism for disconnecting the main canopy be as rugged as possible to withstand the full load which may be imposed thereon and particularly the reaction force which develops when the main canopy opens and which may greatly exceed the parachutist's weight, while the mechanism should be as simple as possible to operate with minimal effort required of the parachutist and minimal stresses imposed on critical parts of the mechanism.

Conventionally the main parachute canopy is released by simultaneously disconnecting a pair of buckles which releasably connect the main parachute canopy to the harness. Generally, the buckles are actuated manually by the parachutist through a manual operator mounted on the harness. Due to the considerable load acting on the buckles the force required of the parachutist to actuate the release mechanism can be substantial. This makes it difficult for the parachutist to actuate release of the main canopy and presents a problem in obtaining reliable operation of the release mechanism. In U.S. Pat. No. 3,765,627 there is disclosed a system which seeks to overcome this problem by reducing the force required of the parachutist to release the buckle connection to the main parachute canopy. This is achieved, in accordance with the system disclosed in the U.S. Patent by providing a force multiplier between the release mechanism for the buckle and a handle which is pulled by the parachutist. The force multiplier essentially comprises a pulley system which effectively multiplies the force required to pull the handle by a factor of two. However, while this system reduces the force required of the parachutist, it does not reduce the actual forces acting on the release mechanism associated with the buckles. In this case, the force multiplier is connected to the buckle release mechanism by a cable, so that the full force required to actuate the release mechanism is transmitted through the cable. Accordingly, the cable and the various components associated with the release mechanism for the cable must be designed to withstand the full force normally required to actuate this kind of mechanism. Therefore, this system does not provide a fully satisfactory solution to the problem. Furthermore, the force multiplier is relatively bulky so that it has to be supported on a mounting plate mounted, for example, on the front of the harness.

SUMMARY OF THE INVENTION

It is an object of the present invention to provide a release mechanism which is as simple as possible to operate with minimal effort required of the parachutist and minimal stresses imposed on critical parts of the mechanism.

It is another object of the invention to provide a parachute release mechanism whereby a main parachute canopy can be released and a reserve parachute canopy can be deployed sequentially with a short time delay between them, using a single operation on the part of the parachutist.

It is another object of the invention to provide a release mechanism in which release of a main parachute canopy and deployment of a reserve canopy are actuated by respective cable means which are interconnected to be actuated sequentially using only a single operation of the parachutist.

It is a further object of the invention to provide in such a release mechanism means actuatable to deploy the reserve canopy without disconnecting the main canopy.

In accordance with the first of these objects, the present invention provides a release mechanism for a parachute harness, in which cable mean are used to open a releasable connection connecting two harness parts.

A releasable connection is provided by a strap (or equivalent member) which is fixedly attached at one end thereof to a first harness part, and slidably passes at least once between at least one connecting member secured to a second harness part. The strap has a free end which is releasably secured to one of the harness parts so as to maintain a releasable connection between the harness parts. When the free end is released, the strap allows the harness parts to separate from each other.

Means releasably secure the free end of the strap or equivalent member. These means may include a tab fixed to one of the harness parts and having an aperture through which a free end portion of the strap or equivalent member can pass, and a locking member engageable with the free portion of the strap or equivalent member to normally prevent the free end portion from being retracted through the tab aperture. The strap or equivalent member may thus be released by withdrawing the locking member from its engagement with the free end portion of the strap or equivalent member, thereby releasing the harness parts.

The invention provides a parachute release mechanism comprising a harness connector for releasably connecting a main canopy to a parachute harness, actuating means associated with the harness connector and actuatable to sequentially disconnect the main canopy from the harness and to deploy a reserve canopy.

An advantageous feature related to this aspect of the invention is that the actuating means comprises separate cables for the release and deployment mechanisms for the main and reserve parachutes respectively. The cables are interconnected in a manner such that movement of one of the cables to a first position actuates release of the main canopy and further movement of that cable causes movement of the other cable to actuate deployment of the reserve canopy. Prior U.S. Pat. No. 3,765,627 does disclose a system for sequential release of the main canopy and deployment of the reserve canopy, but the system used requires that the actuating means for these operations be mounted directly on the reserve canopy enclosure. Therefore, the reserve canopy enclosure, for practical purposes, must be mounted on the front of the parachute harness, which is inconvenient for the parachutist. In the system of the present invention a cable connection is provided to actuate the reserve canopy, so that the reserve canopy can be mounted at any convenient position, for example, at the back of the harness. This permits also the enclosure for the reserve canopy to be made integral with that for the main canopy, for example, as a separate compartment attached adjacent to a compartment for the main canopy.

A further advantageous feature is the provision of the means which permit independent deployment of the reserve canopy. This is desirable since in some main canopy failure situations it is not necessary to release the main canopy, in which case it is preferred not to release the main canopy.

Advantageously, the release means includes cable means for actuating release of the harness connector and cable means for actuating release of the reserve canopy and means interconnecting the respective cable means in a manner in which movement thereof to a first position actuates release of the harness connector and further movement thereof to a second position actuates release of the reserve canopy.

With the arrangement as defined above, the vital functions of disconnecting or ejecting a main canopy and of releasing (i.e. deploying) a reserve parachute can be carried out by actuation of a single release means in a manner assuring the correct order of the operation and with only a short delay between operations since the operations are carried out by virtually a single movement on the part of the parachutist. Thus, in the case of an emergency, namely upon malfunction of the main canopy, the parachutist does not have to think about carrying the necessary operations in the right order, as is normally the case, but these are carried automatically using virtually only a single operation on the part of the parachutist. Accordingly, the delay between the operations can be made very small, depending only on the time it takes for the parachutist to move the release means from the first to the second positions mentioned above. Preferably the parachute also includes override means permitting independent release of the reserve canopy with respect to that of the main canopy.

The invention will now be described by example with reference to the accompanying drawings in which:

BRIEF DESCRIPTION OF THE DRAWINGS

FIG. 1 is a view of a connecting device for a harness strap suitable for releasably connecting a parachute canopy to a parachute harness;

FIG. 2 is a side view of the connector of FIG. 1;

FIG. 3 is a further side view showing a release mechanism for the connector of FIG. 1;

FIG. 4 is a further view of the release mechanism of FIG. 3;

DETAILED DESCRIPTION OF THE DRAWINGS

Figure 5:
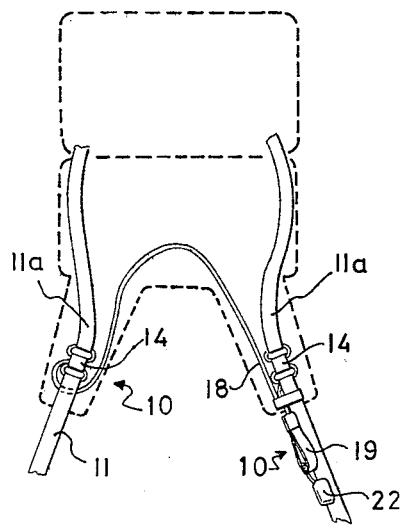
FIG. 5 is a view showing parts of a parachute harness.

Referring to FIGS. 1 and 2 of the drawings, these show a releasable connecting link denoted generally as 10, intended to be connected between a harness strap 11 and a main canopy riser 12. In practice there will be two such connecting links, herein referred to as lefthand and righthand links, as shown in FIG. 5. The connecting link 10 comprises a pair of steel D-rings 13 attached respectively to the harness strap 11 and a strap 11a connecting the main riser 12. The straps 11 and 11a are connected to the respective D-rings in conventional manner by wrapping each strap about one leg of each of the respective rings and sewing the end of the strap to itself. The D-rings 13 are interconnected by a connecting strap 14 which is fixedly connected at one end to the strap 11a and is wrapped in turn around the free legs of the D-rings 13 as shown in FIG. 2. The free end of the strap 14 is formed with a locking loop 15 which is releasably secured in a manner to be described. The arrangement is such as to achieve a mechanical advantage in a manner somewhat analogous to that of a pulley system. The degree of mechanical advantage obtained depends on the number of loops made, that is, the number of times the strap passes around the free legs of the D-rings. In the example shown in FIG. 2 the strap 14 passes twice around the free leg of the lower ring 13 and once around the free leg of the upper ring 13 to obtain a mechanical advantage of four. Consequently, the strap 14 is capable of securing the main canopy riser to the harness with a load between the latter of up to four times the tension in the strap. The mechanical advantage can be increased by increasing the number of passes around the free leg of the D-rings, but the friction, which also will increase, poses an upper practical limit to the number of passes.

The locking loop 15 at the free end of the strap 14 passes through an aperture 16 in a locking tab 17 which is secured at one end to the strap 11a. The free end of the strap 14 is releasably secured by a release cable 18 passing through the locking loop on one side of the tab 17 so as to normally prevent the free end or loop 15 from being retracted through the aperture 16 in the tab. Release of the main canopy riser from the harness strap 11 is actuated by pulling a release handle 19 (FIG. 3) at one end of the cable 18, whereby the free end of the cable 18 is withdrawn from the locking loop 15 of the strap 14, which thereby freely unwinds itself from the D-rings under tension of the load acting on the harness.

Normally the free end of the release cable 18 is located in a pocket 20 sewn to the strap 11a.

It will be appreciated that, in use, a substantial load may be imposed on the connecting link between the main canopy riser and the harness, this load including the weight of the parachutist and any sudden impact loads which may occur as, for example, when the main canopy opens. Known mechanical devices for releasing the main canopy of a parachute generally have to withstand the full load acting on the harness. With the above described design, however, the mechanical advantage which is obtained greatly reduces the loading imposed on the release mechanism, whereby the release mechanism, as in the example described, can be simple in design yet fully reliable in operation.

Referring now more particularly to FIGS. 3 and 4 of the drawings, these show in detail an arrangement in which the main canopy can be ejected and the reserve canopy can be released from the container, in their proper sequence and with a sufficient, yet very small time delay between operations, through operation of a single release handle 19. The release handle 19 is attached to a pair of release cables 18, as previously described, with the cables being linked respectively with the lefthand and the righthand main canopy release mechanism, whereby pulling of the release handle to a predetermined position simultaneously actuates release of the lefthand and righthand main canopy connecting links in the manner described. In addition a pair of cables 21 extend from a reserve canopy release device (not shown) to an override handle 22. The release mechanism for the reserve canopy can be of conventional construction and thus is not described herein. However, in the embodiment of the invention as shown in FIGS. 3 and 4 the reserve release cables 21 pass through a grommet 23 attached to a lug 24 provided on the release handle 19. Under normal conditions the relationship between the release handle 19 and override handle 22 is as shown in FIGS. 3 and 4, in which both handles are in a fully retracted position, with the override handle 22 being separated from the grommet 23 by a portion 21a of the release cables 21. The arrangement is such that on initially pulling the release handle 19 which is connected to the main canopy release mechanism, the grommet 23 merely slides over the portion 21a of the cable 21 so that at a first predetermined position the main canopy will be released without any effect on the reserve canopy. As the release handle 19 is pulled further the grommet 23 engages the override handle 22 so that further movement of the release handle 19 also causes simultaneous movement of the override handle 22 so that, at a second predetermined position, which follows the first predetermined position, the movement of the release handle automatically causes release of the reserve canopy. In this way only a single movement is required on the part of the parachutist in order to eject the main canopy and release the reserve canopy in the proper sequence and with a very short time delay which depends on how fast the release handle is pulled and on the length of the portion 21a. Typically the delay time would be of the order of one-fortieth of a second.

It is possible to release the reserve canopy independently of the main canopy by pulling only the override handle 22.

When not in use, the handles 19 and 22 are located adhesively in contact with the harness 11. This is achieved by means of "Velcro (Registered Trade Mark) hook" pads 25 sewn to the harness webbing and complementary "Velcro pile" backings 26 sewn to the handles 19 and 22.

Figure 6A:
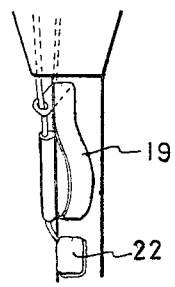
FIGS. 6A to 6G are views showing respectively various positions of the release mechanism and related conditions of a main parachute canopy and a reserve canopy shown in sequence following a main canopy malfunction.
Figure 6C:
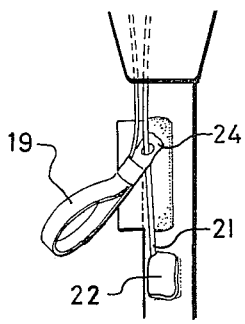
Figure 6E:
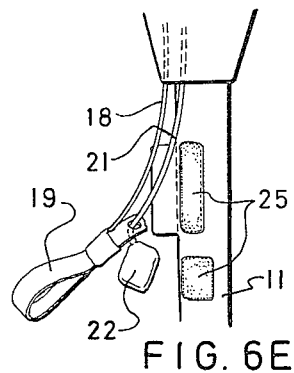
Figure 6B:
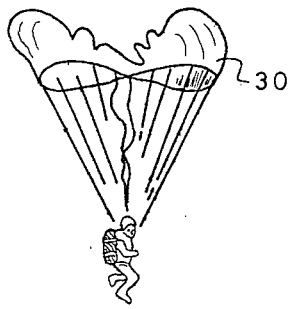

FIGS. 6A to 6G illustrates schematically the operation of the release mechanism described above. FIG. 6a illustrates the normal position of the release handle 19 and override handle 22. FIG. 6B shows a stage in the operation of a parachute in which the main canopy has been deployed but has malfunctioned.

Figure 6D:
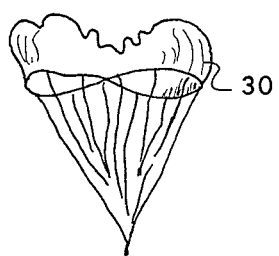

When the malfunction occurs the parachutist pulls the main handle 19. At the position shown in FIG. 6C, of the handle 19, the main canopy is disconnected from the harness and escapes, as shown in FIG. 6D.

Figure 6F:
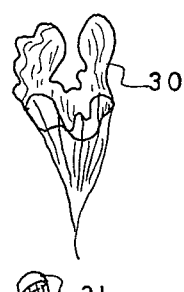
Figure 6G:
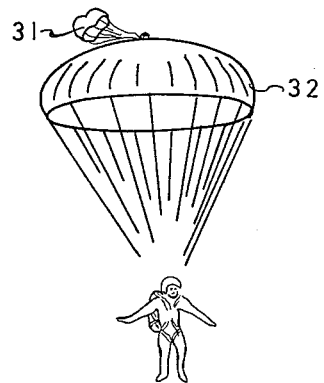

As the release handle 19 is continued to be pulled the grommet 23 attached to the release handle 19 slides along the cables 21 towards the override handle 22, as shown in FIG. 6E, and thereby causes the release of the reserve parachute pilot 31 and reserve parachute 32 as illustrated in FIG. 6F. FIG. 6G shows the reverse parachute 32 after it has fully opened so as to suspend the parachutist.

I claim:

1. A parachute release mechanism for an assembly that includes a main parachute canopy, a separate reserve parachute canopy and a parachute harness to be worn by a parachutist, the release mechanism comprising:

a harness connector for releasably connecting the main parachute canopy to the parachute harness, and actuating means for sequentially actuating release of the main canopy from the harness connector and for then effecting deployment of the reserve parachute canopy from a container therefor;

the actuating means comprising:

first cable means so connected to the harness connector that when the first cable means are pulled to a first predetermined extent, this effects release of the main canopy from the harness connector;

second cable means movable for effecting deployment of the reserve canopy;

connecting means for providing a relative sliding interconnection of the first and second cable means, such that the first cable means may be pulled at least to the first predetermined extent while the first cable means slides past the second cable means; the connecting means also including means for effecting movement of the second cable means when the first cable means has been pulled to an extent exceeding the first predetermined extent, which is the movement of the second cable means that effects deployment of the reserve canopy, whereby the reserve canopy is deployed after release of the main canopy and the connecting means being adapted to further permit the reserve canopy deployment movement of the second cable means independently of movement of the first cable means, whereby the reserve canopy can be deployed without first releasing the main canopy.

2. A parachute release mechanism as claimed in claim 1, wherein the connecting means comprises apertured means having an aperture therethrough and being secured to the first cable means, and the second cable means extending through the aperture for effecting the sliding interconnection between the first and second cable means; and the apertured means also comprising the means for effecting movement of the second cable means.

3. A parachute release mechanism as claimed in claim 2, wherein engagable means are provided on the second cable means for being engaged by the apertured means after the first cable means has moved to the first predetermined extent, such that further movement of the first cable means moves the second cable means to deploy the reserve canopy.

4. A parachute release mechanism as claimed in claim 3, wherein the engagable means comprises a first release handle which is attached to the second cable means; upon sufficient movement of the apertured means, the apertured means engages the first release handle to effect the said movement of the second cable means after the first cable means has been pulled to an extent exceeding the first predetermined extent.

5. A parachute release mechanism as claimed in claim 4, wherein the apertured means comprises a tab connected with the first cable means and the aperture comprises an eyelet in the tab.

6. A parachute release mechanism as claimed in claim 4, wherein a second release handle is attached to the first cable means, and the apertured means is connected with the second release handle.

7. A parachute release mechanism as claimed in claim 6, wherein the apertured means comprises a tab connected with the second release handle and the aperture comprises an eyelet in the tab.

8. The apparatus of claim 7, wherein the first and the second release handles are detachably secured to the harness of the parachute.

9. A parachute assembly comprising a harness for a parachutist, a container affixed to the harness; a main parachute canopy provided in the container and a reserve parachute canopy provided in the container; means for independently deploying the main and reserve canopies from the container;

a main canopy riser for connecting the harness to the main parachute canopy; a harness connector for releasably connecting the main canopy riser to the harness; and actuating means for sequentially actuating release of the main canopy from the harness connector and for then effecting deployment of the reserve parachute canopy from the container;

the actuating means comprising:

first cable means so connected to the harness connector that when the first cable means are pulled to a first predetermined extent, this effects release of the main canopy from the harness connector;

second cable means movable for effecting deployment of the reserve canopy;

connecting means for providing a relative sliding interconnection of the first and second cable means, such that the first cable means may be pulled at least to the first predetermined extent while the first cable means slides past the second cable means; the connecting means also including means for effecting movement of the second cable means when the first cable means has been pulled to an extent exceeding the first predetermined extent, which is the movement of the second cable means that effects deployment of the reserve canopy, whereby the reserve canopy is deployed after release of the main canopy and the connecting means being adapted to further permit the reserve canopy deploying movement of the second cable means independently of movement of the first cable means, whereby the reserve canopy can be deployed without first releasing the main canopy.

10. A parachute assembly as claimed in claim 9, wherein the harness connector includes a first connecting member attached to the main canopy riser; a second connecting member attached to the harness and a strap-like member providing a looped interconnection between the first and second connecting members, and wherein the first cable means engages with the strap-like member to maintain the looped interconnection prior to movement of the first cable means to the first predetermined extent.

* * * * *